(12) United States Patent
Tangirala et al.

(10) Patent No.: US 7,526,912 B2
(45) Date of Patent: May 5, 2009

(54) PULSE DETONATION ENGINES AND COMPONENTS THEREOF

(75) Inventors: Venkat Eswarlu Tangirala, Niskayuna, NY (US); Adam Rasheed, Glenville, NY (US); Christian Lee Vandervort, Voorheesville, NY (US); Anthony John Dean, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 598 days.

(21) Appl. No.: 11/262,652

(22) Filed: Oct. 31, 2005

(65) Prior Publication Data

US 2008/0006019 A1    Jan. 10, 2008

(51) Int. Cl.
*F02C 5/02* (2006.01)

(52) U.S. Cl. ........................ 60/247; 60/39.76

(58) Field of Classification Search ................ 60/38.38, 60/39.39, 39.4, 39.76, 39.78, 247, 248
See application file for complete search history.

(56) References Cited

U.S. PATENT DOCUMENTS

| | | | | |
|---|---|---|---|---|
| 5,557,926 | A | * | 9/1996 | Hunter et al. ................ 60/247 |
| 5,937,635 | A | * | 8/1999 | Winfree et al. ............. 60/39.38 |
| 6,505,462 | B2 | * | 1/2003 | Meholic .................... 60/39.39 |
| 2004/0237504 | A1 | | 12/2004 | Pinard et al. |
| 2007/0180811 | A1 | * | 8/2007 | Rasheed et al. ............ 60/39.76 |

FOREIGN PATENT DOCUMENTS

EP    1 138 922 A1    3/2001

OTHER PUBLICATIONS

Experimental Investigations of an Axial Turbine Driven by a Multi-tube Pulsed Detonation Combustor System, Rasheed et al., 41st AIAA/ASME/SAE/ASEE Joint Propulsion Conference, Jul. 10-13, 2005, Tucson, AZ.

* cited by examiner

*Primary Examiner*—Louis J Casaregola
(74) *Attorney, Agent, or Firm*—Penny A. Clarke

(57) ABSTRACT

A pulse detonation engine comprises a primary air inlet; a primary air plenum located in fluid communication with the primary air inlet; a secondary air inlet; a secondary air plenum located in fluid communication with the secondary air inlet, wherein the secondary air plenum is substantially isolated from the primary air plenum; a pulse detonation combustor comprising a pulse detonation chamber, wherein the pulse detonation chamber is located downstream of and in fluid communication with the primary air plenum; a coaxial liner surrounding the pulse detonation combustor defining a cooling plenum, wherein the cooling plenum is in fluid communication with the secondary air plenum; an axial turbine assembly located downstream of and in fluid communication with the pulse detonation combustor and the cooling plenum; and a housing encasing the primary air plenum, the secondary air plenum, the pulse detonation combustor, the coaxial liner, and the axial turbine assembly.

19 Claims, 3 Drawing Sheets

PULSE DETONATION ENGINES AND COMPONENTS THEREOF

STATEMENT REGARDING FEDERALLY SPONSORED RESEARCH OR DEVELOPMENT

This invention was made with U.S. government support under Government Contract No.: NAS3- 01135 awarded by the National Aeronautics and Space Administration (NASA). The U.S. government has certain rights in this invention.

BACKGROUND

The present disclosure generally relates to turbine engines, and more particularly, to pulse detonation engines.

A conventional gas turbine engine generally includes a compressor and turbine arranged on a rotating shaft(s), and a combustion section between the compressor and turbine. The combustion section burns a mixture of compressed air and liquid and/or gaseous fuel to generate a high-energy combustion gas stream that drives the rotating turbine. The turbine rotationally drives the compressor and provides output power. Industrial gas turbines are often used to provide output power to drive an electrical generator or motor. Other types of gas turbines may be used as aircraft engines, on-site and supplemental power generators, and for other applications.

In an effort to improve the efficiency of gas turbine engines, pulse detonation engines (PDE) have been purposed. In a generalized PDE, fuel and oxidizer (e.g., oxygen-containing gas such as air) are admitted to an elongated combustion chamber at an upstream inlet end. An igniter is utilized to detonate this charge (either directly or through a deflagration-to-detonation transition (DDT)). A detonation wave propagates toward the outlet at supersonic speed causing substantial combustion of the fuel/air mixture before the mixture can be substantially driven from the outlet. The result of the combustion is to rapidly elevate pressure within the chamber before substantial gas can escape inertially through the outlet. The effect of this inertial confinement is to produce near constant volume combustion.

The PDE can be positioned as an augmentor or as the main combustor or both. Only recently has pulse detonation been purposed for use in the main combustor. One main challenge in developing pulse detonation engines having a pulse detonation combustor (PDC) is understanding and overcoming the effects of high-pressure pulses (decaying blast waves) on turbine performance and life of the engine.

Accordingly, a continual need exists for improved pulse detonation engines.

BRIEF SUMMARY

Disclosed herein are pulse detonation engines and components thereof.

One embodiment of a pulse detonation engine comprises a primary air inlet; a primary air plenum located in fluid communication with the primary air inlet; a secondary air inlet; a secondary air plenum located in fluid communication with the secondary air inlet, wherein the secondary air plenum is substantially isolated from the primary air plenum; a pulse detonation combustor comprising a pulse detonation chamber, wherein the pulse detonation chamber is located downstream of and in fluid communication with the primary air plenum; a coaxial liner surrounding the pulse detonation combustor defining a cooling plenum, wherein the cooling plenum is in fluid communication with the secondary air plenum; an axial turbine assembly located downstream of and in fluid communication with the pulse detonation combustor and the cooling plenum; and a housing encasing the primary air plenum, the secondary air plenum, the pulse detonation combustor, the coaxial liner, and the axial turbine assembly.

Another embodiment of a pulse detonation engine comprises a housing; a first opening in the housing defining a primary air inlet; a primary air plenum located in fluid communication with the primary air inlet; a second opening in the housing defining a secondary air inlet; a secondary air plenum located in fluid communication with the secondary air inlet, wherein the secondary air plenum is defined by an inner housing and wherein the primary air plenum is defined by an inner wall of the housing and an outer wall of the inner housing such that the secondary air plenum is substantially isolated from the primary air plenum; a pulse detonation combustor comprising a plurality of pulse detonation chambers, wherein the pulse detonation chambers are each located downstream of and in fluid communication with the primary air plenum; a coaxial liner surrounding the pulse detonation combustor; a cooling plenum defined by an inner wall of the coaxial liner and an outer wall of the pulse detonation combustor, wherein the cooling plenum is in fluid communication with the secondary air plenum; an axial turbine assembly located downstream of and in fluid communication with the pulse detonation combustor and the cooling plenum; and wherein the housing encases the primary air plenum, the secondary air plenum, the pulse detonation combustor, the coaxial liner, and the axial turbine assembly.

One embodiment of an inlet assembly for a pulse detonation engine, comprises a housing comprising an inner wall and an outer wall; a first opening in the housing defining a primary air inlet; an inner housing located within the housing, wherein a primary air plenum is defined by the inner wall of the housing and an outer wall of the inner housing, wherein the primary air plenum is in fluid communication with the primary air inlet; a secondary air inlet defined by a second opening in the housing and an inner housing opening in the inner housing; and a secondary air plenum defined by the inner housing, wherein the primary air plenum is substantially isolated from the secondary air plenum.

One embodiment of a transition piece for a pulse detonation engine comprises a body configured to modify a velocity profile of a high-pressure gas exiting a pulse detonation chamber.

The above described and other features are exemplified by the following Figures and detailed description.

BRIEF DESCRIPTION OF THE DRAWINGS

Referring to the exemplary drawings wherein like elements are numbered alike in the several Figures.

DETAILED DESCRIPTION

Disclosed herein are pulse detonation engines and components of the pulse detonation engine. As will be discussed in greater detail, the pulse detonation engine generally comprises a pulse detonation combustor located within a coaxial liner that allows the pulse detonation combustor to be cooled;

a transition piece located downstream of the pulse detonation combustor configured to direct flow from the combustor and coaxial liner to an axial turbine assembly located downstream; and the axial turbine assembly. A source of a compressed oxidizer, e.g., a compressor, is located upstream of the pulse detonation combustor.

In the descriptions that follow, the term "axial" refers broadly to a direction parallel to the axis about which the rotating components of the gas turbine engine rotate. An "upstream" direction refers to the direction from which the local flow is coming, while a "downstream" direction refers to the direction in which the local flow is traveling. In the most general sense, flow through the engine tends to be from front to back, so the "upstream direction" will generally refer to a forward direction, while a "downstream direction" will refer to a rearward direction.

As used herein, a "pulse detonation combustor" (PDC) is understood to mean any device or system that produces both a pressure rise and velocity increase from a series of repeating detonations or quasi-detonations within the device. A "quasi-detonation" is a supersonic turbulent combustion process that produces a pressure rise and velocity increase higher than the pressure rise and velocity increase produced by a deflagration wave. Embodiments of PDCs include a means of igniting a fuel/oxidizer mixture, for example a fuel/air mixture, and a detonation chamber, in which pressure wave fronts initiated by the ignition process coalesce to produce a detonation wave. Each detonation or quasi-detonation is initiated either by external ignition, such as spark discharge or laser pulse, or by gas dynamic processes, such as shock focusing, autoignition or by another detonation (cross-fire). The geometry of the detonation chamber is such that the pressure rise of the detonation wave expels combustion products out the PDC exhaust to produce a thrust force. Pulse detonation can be accomplished in a number of types of detonation chambers, including detonation tubes, shock tubes, resonating detonation cavities and annular detonation chambers. As used herein, the term "tube" includes pipes having circular or non-circular cross-sections. Exemplary tubes include cylindrical tubes, as well as tubes having polygonal cross-sections, for example hexagonal tubes.

Figure 1:
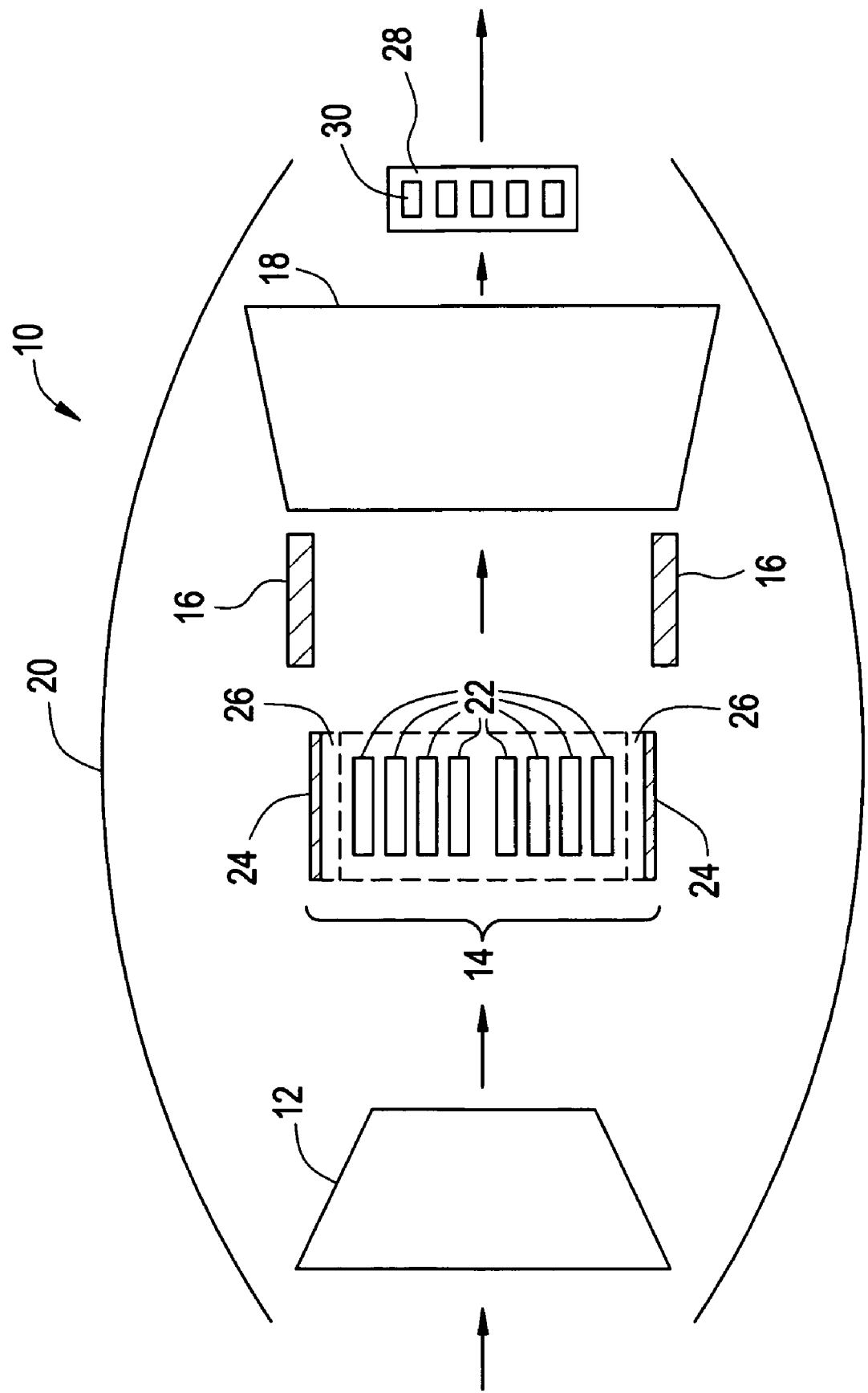
FIG. 1 illustrates an embodiment of a pulse detonation engine.

FIG. 1 illustrates an exemplary pulse detonation engine (PDE), generally designated 10. The PDE comprises a compressor 12, a pulse detonation combustor (PDC) 14, a transition piece 16, and an axial turbine assembly 18. In one embodiment, the compressor 12 is located upstream of and in fluid communication with the PDC 14, which is located upstream of and in fluid communication with the axial turbine assembly 18 via the transition piece 16. Stated another way, the compressor 12 is in serial axial fluid communication with the PDC 12 and the axial turbine assembly 18. In one embodiment, each of the compressor 12, PDC 14, transition piece 16 and the axial turbine assembly 18 are located within a housing 20, which can be particularly beneficial for use in mobile crafts (e.g., aircrafts and tanks). Alternatively, the compressor 12 can optionally be located outside of the housing 12 (e.g., in on-site and supplemental power generators).

The compressor 12 compresses primary air (e.g., oxygen-containing gas such as air), and supplies the compressed primary air to the pulse detonation chamber(s) 22 of the PDC 14. While FIG. 1 illustrates eight pulse detonation chambers 22, the number and arrangement of pulse detonation chambers varies depending on the application. The PDC 14 comprises at least one pulse detonation chamber 22 adapted to receive the primary airflow and a fuel flow. As used herein, the phrase "primary air" should be understood to refer to the air (or other oxidizer) supplied to each pulse detonation chamber 22 for the primary detonation in the pulse detonation chamber 22. In one embodiment, the primary air is oxygen. In other embodiments, the primary air is air.

In operation, the primary air and the fuel are introduced into the pulse detonation chambers 22 and are detonated either by external ignition, such as spark discharge or laser pulse, or by gas dynamic processes, such as shock focusing, autoignition or by another detonation (cross-fire). A few examples of fuel types include, but are not limited to, hydrogen, distillate fuels and natural gas. Exemplary distillate fuels include, but are not limited to, diesel fuel #2, Jet A fuel, kerosene and JP8. In one embodiment, the charge(s) of primary air and fuel are detonated in parallel, i.e., each charge is detonated at substantially the same time. In various other embodiments, the charges are detonated at different times.

The PDC 14 advantageously comprises a coaxial liner 24 defining a cooling plenum 26 (gap) between an outer wall of the PDC 14 and an inner wall of the coaxial liner. Secondary air travels along cooling plenum 26 acting to cool the PDC 14 and to cool downstream components including, but not limited to, the axial turbine assembly 18. As used herein, "secondary air" should be understood to mean air not supplied to the pulse detonation chambers 22. In one embodiment, the source of primary air and secondary air may be the same, e.g., air from compressor 12. In other embodiments, the source of primary air and secondary air may be different. The cooling plenum 26 and each pulse detonation chamber 22 are in fluid communication with the axial turbine assembly 18 via transition piece 16. The transition piece 16 is configured to modify the velocity profile of the high-pressure gas exiting the pulse detonation chamber(s) 22 and is configured to allow mixing of the secondary air from the cooling plenum 26 with the high-pressure gas from the pulse detonation chamber. The exact shape of the transition piece 16 varies depending on the desired application.

In various embodiments, the transition piece 16 optionally comprises a turbulent flow mixer(s) (shown in FIG. 4) located on an outer surface of the transition piece, i.e., a surface in fluid communication with secondary air from the cooling plenum 26 and gases from the PDC 14. These turbulent flow mixers comprise any geometry that is capable of creating eddies, swirls and the like. Suitable geometries include hemispherical, pyramid-like shapes, square or rectangular protrusions, and the like.

The axial turbine assembly 18 comprises at least one turbine stage. In one embodiment, the turbine stage comprises a stator and a rotor. The stator is fixed, i.e., does not rotate like the rotor, and acts to direct flow. In various other embodiments, the turbine assembly 18 does not employ a stator. Rather, the flow can be directed by appropriately angling outlets of the pulse detonation chambers 22. Additionally/alternatively, the flow can be directed by counter-rotating turbines. The axial turbine assembly 18 can be used to provide thrust via the expulsion of the exhaust gases, to provide mechanical power by rotating a shaft connected to one of the turbines, or to provide a combination of thrust and mechanical power. In one embodiment, a shaft or shafts driven by one or more of the turbine stages power the compressor 12. Further, this energy can be used to power a vehicle (such as an airplane, a helicopter, a tank, or the like), a power-generation facility or assembly, the gas turbine engine itself, and the like.

In various other embodiments, an optional second pulse detonation combustor 28 is located downstream of the axial turbine assembly 18. Pulse detonation combustor 28 comprises a similar or different configuration as PDC 14. For example, the pulse detonation combustor 28 comprises at least one pulse detonation chamber 30 adapted air (e.g., oxygen-containing gas such as air) from the axial turbine assembly 18 and fuel. In operation, the air and the fuel are introduced into the pulse detonation chambers 30 and are detonated by any suitable manner. Some exemplary detonation techniques are discussed above in relation to PDC 14.

Further, it is to be understood that the pulse detonation engine 10 can be modified, as understood by those skilled in the art, to include various other components that are typically employed in gas turbine engines. While components vary depending on the application, exemplary additional components include, but are not limited to, fuel injection systems, turbofan(s), ram ducts, valves, control systems (e.g., a computer), and the like. Moreover, the PDE engine 10 can be adapted to be employed in both turbofan and turboshaft engines.

Figure 2:
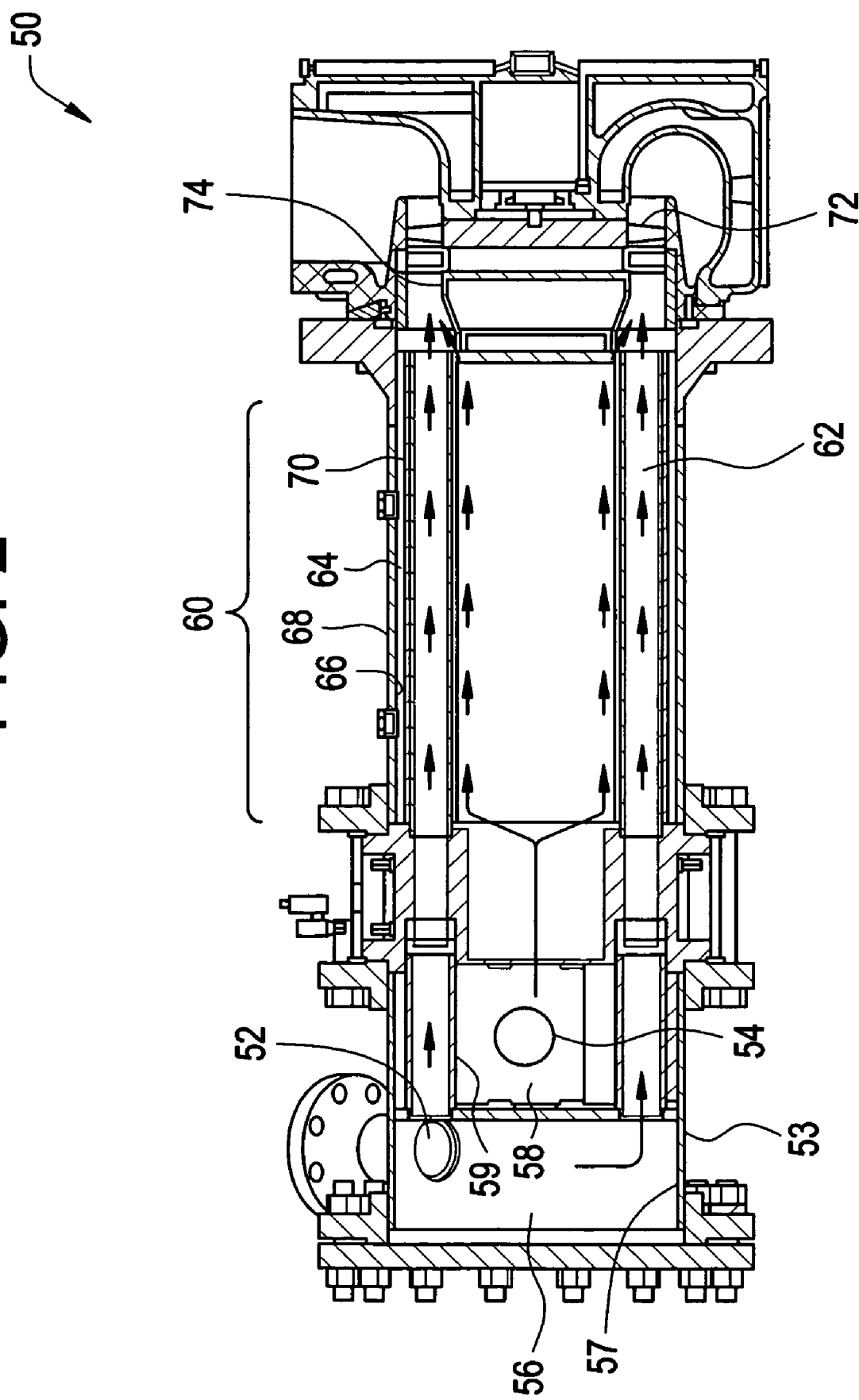
FIG. 2 is a cross sectional view of a pulse detonation engine.
Figure 3:
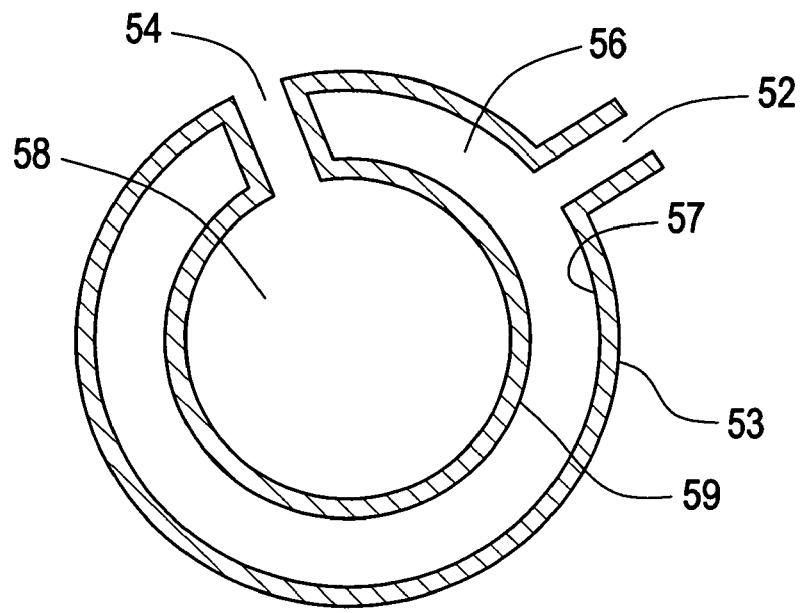
FIG. 3 is a cross sectional view of any exemplary primary plenum and a secondary air plenum.
Figure 4:
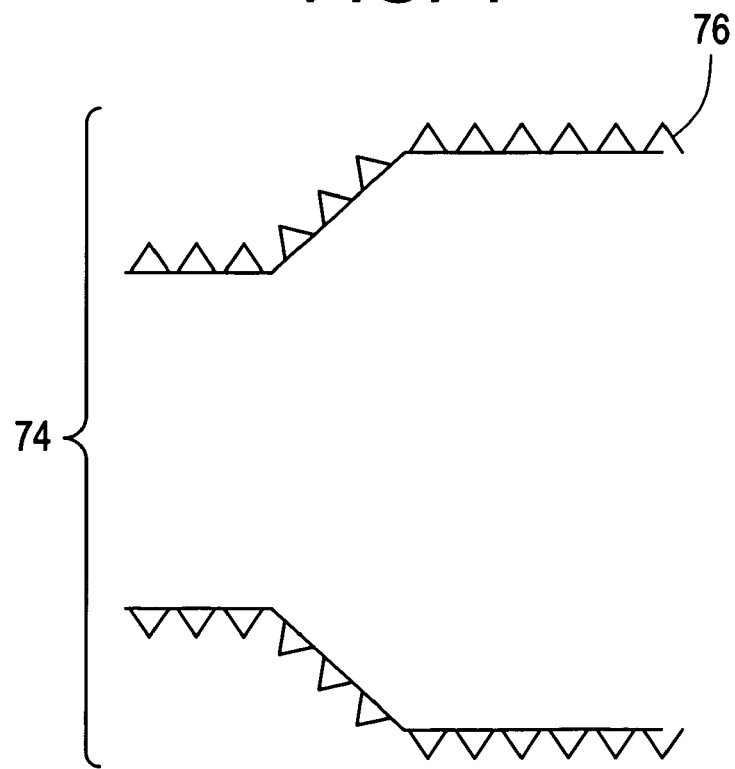
FIG. 4 is a cross sectional view of a transition piece of a pulse detonation engine.

FIGS. 2-4 illustrate an exemplary pulse detonation engine (PDE), generally designated 50, and components of the PDE 50. The PDE comprises a primary air inlet 52 and a secondary air inlet 54. The primary inlet 52 is configured to allow primary air (e.g., oxygen-containing gas such as air) from a primary air source to be directed to a primary air plenum 56. Similarly, the secondary air inlet 54 is configured to allow secondary air from a secondary air source to be directed to a secondary air plenum 58. The primary air plenum 56 is substantially isolated from the secondary air plenum 58. Substantially isolated, as used in relation to the primary air plenum 56 and the secondary air plenum 58, refers to less than or equal to 5 volume percent of primary air flow into the secondary air plenum 58, and even more specifically less than or equal to 1 volume percent of primary air flow into the secondary air plenum 58. In one embodiment, the primary air plenum 56 is hermetically sealed from the secondary air plenum 58.

In one embodiment, the source of primary air and secondary air may be the same. In other embodiments, the source of primary air and secondary air may be different. Sources of primary and secondary air include any oxygen containing gas, such as gases from a compressor(s) (not shown), and the like. In one embodiment, the primary air is oxygen. In other embodiments, the primary air is air.

In one embodiment, illustrated in FIG. 3, the primary air plenum 56 is defined by an inner wall 57 of a housing 53 for the PDE 50 and an outer wall 59 of an inner housing that defines the secondary air plenum 58. While the primary air plenum 56 and the secondary plenum 58 are illustrated as having a substantially circular cross-section, the plenums 56 and 58 can comprise non-circular cross-sections as well.

The primary air plenum 56 is configured to allow the primary air to flow into a pulse detonation combustor 60 comprising a plurality of pulse detonation chambers 62. More particularly stated, the primary air is directed to each pulse detonation chamber 62. Arrows illustrate the general flow direction of primary air. Exemplary pulse detonation chambers include, but are not limited to detonation tubes, shock tubes, resonating detonation cavities and annular detonation chambers. The total number of pulse detonation chambers varies depending on the application.

In operation, the primary air and fuel are introduced into each pulse detonation chamber 62 and are detonated either by external ignition, such as spark discharge or laser pulse, or by gas dynamic processes, such as shock focusing, autoignition or by another detonation (cross-fire). Exemplary fuels are discussed above. In one embodiment, the charge(s) of primary air and fuel are detonated in parallel, i.e., each charge is detonated at substantially the same time. In various other embodiments, the charges are detonated at different times.

Meanwhile, secondary air from the secondary air plenum 58 is directed to a cooling plenum 64 defined by an inner wall 66 of a coaxial liner 68 and an outer wall 70 of the PDC 60. Arrows illustrate the general flow direction of primary air. Secondary air travels along cooling plenum 64 acting to cool the PDC 60 and to cool downstream components including, but not limited to, a single stage axial turbine 72. In other embodiments, a multiple stage axial turbine can be employed. The cooling plenum 64 and each pulse detonation chamber 62 are in fluid communication with the axial turbine 72 via transition piece 74. The transition piece 74 is configured to modify the velocity profile of the high-pressure gas exiting the pulse detonation chamber(s) 62 and is configured to allow mixing of the secondary air from the cooling plenum 64 with the high-pressure gas from the pulse detonation chamber 62. The exact shape of the transition piece will vary depending on the desired application. An exemplary transition piece 62 comprises a truncated funnel shape.

Referring to FIGS. 2 and 4, the transition piece 74 optionally comprises a turbulent flow mixer(s) 76 located on an outer surface of the transition piece, i.e., a surface in fluid communication with secondary air from the cooling plenum 26 and gases from the PDC 14. These turbulent flow mixers comprise any geometry that is capable of creating eddies, swirls and the like. In one embodiment, the turbulent flow mixers 76 comprise baffles having at least one of the following geometries: hemispherical, pyramid-like shapes, square or rectangular protrusions, and the like.

The transition piece is configured to direct the secondary air from the cooling plenum and exhaust from each pulse detonation chamber 62 to the axial turbine 72. The axial turbine 72 can be used to provide thrust via the expulsion of the exhaust gases, to provide mechanical power by rotating a shaft connected to one of the axial turbine 72, or to provide a combination of thrust and mechanical power. This energy can be used to power a vehicle (such as an airplane, a helicopter, a tank, or the like), a power-generation facility or assembly, the gas turbine engine itself, and the like.

Advantageously, embodiments disclosed herein allow various components (e.g., pulse detonation combustors and turbines) to be cooled. This allows a pulse detonation combustor to be employed upstream of a turbine, which in turn can allow for improved efficiency in operating the engine compared to engines that do not employ a pulse detonation combustor located upstream of the turbine. Moreover, various embodiments provide a means to the performance of an aircraft-like axial flow turbine under pulse detonation operation. Stated another way, embodiments provide a means of producing and measuring mechanical work from the energy the energy released from pulse detonation, which can allow for further development of pulse detonation engine designs.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A pulse detonation engine comprising:
   a primary air inlet;
   a primary air plenum located in fluid communication with the primary air inlet;

a secondary air inlet;
a secondary air plenum located in fluid communication with the secondary air inlet, wherein the secondary air plenum is substantially isolated from the primary air plenum;
a pulse detonation combustor comprising a pulse detonation chamber, wherein the pulse detonation chamber is located downstream of and in fluid communication with the primary air plenum;
a coaxial liner surrounding the pulse detonation combustor defining a cooling plenum, wherein the cooling plenum is in fluid communication with the secondary air plenum;
an axial turbine assembly located downstream of and in fluid communication with the pulse detonation combustor and the cooling plenum; and
a housing encasing the primary air plenum, the secondary air plenum, the pulse detonation combustor, the coaxial liner, and the axial turbine assembly.

2. The pulse detonation engine of claim 1, further comprising
a transition piece located downstream of and in fluid communication with the pulse detonation combustor and the cooling plenum, and located upstream of and in fluid communication with the axial turbine assembly.

3. The pulse detonation engine of claim 2, wherein the transition piece further comprises a turbulent flow mixer.

4. The pulse detonation engine of claim 1, further comprising a compressor located upstream of the pulse detonation combustor.

5. The pulse detonation engine of claim 4, wherein the compressor is located in fluid communication with the primary air plenum.

6. The pulse detonation engine of claim 4, wherein the compressor is located in fluid communication with the primary air plenum and the secondary air plenum.

7. The pulse detonation engine of claim 4, wherein the compressor is located within the housing.

8. The pulse detonation engine of claim 1, wherein the primary air plenum is defined by an inner wall of the housing and an outer wall of an inner housing that defines the secondary air plenum.

9. The pulse detonation engine of claim 1, wherein the cooling plenum is defined by an inner wall of the coaxial liner and an outer wall of the pulse detonation combustor.

10. The pulse detonation engine of claim 1, further comprising a second pulse detonation combustor located downstream of and in fluid communication with the axial turbine assembly.

11. The pulse detonation engine of claim 1, further comprising a plurality of pulse detonation chambers.

12. A pulse detonation engine comprising:
a housing;
a first opening in the housing defining a primary air inlet;
a primary air plenum located in fluid communication with the primary air inlet;
a second opening in the housing defining a secondary air inlet;
a secondary air plenum located in fluid communication with the secondary air inlet, wherein the secondary air plenum is defined by an inner housing and wherein the primary air plenum is defined by an inner wall of the housing and an outer wall of the inner housing such that the secondary air plenum is substantially isolated from the primary air plenum;
a pulse detonation combustor comprising a plurality of pulse detonation chambers, wherein the pulse detonation chambers are each located downstream of and in fluid communication with the primary air plenum;
a coaxial liner surrounding the pulse detonation combustor;
a cooling plenum defined by an inner wall of the coaxial liner and an outer wall of the pulse detonation combustor, wherein the cooling plenum is in fluid communication with the secondary air plenum;
an axial turbine assembly located downstream of and in fluid communication with the pulse detonation combustor and the cooling plenum; and
wherein the housing encases the primary air plenum, the secondary air plenum, the pulse detonation combustor, the coaxial liner, and the axial turbine assembly.

13. The pulse detonation engine of claim 12, further comprising
a transition piece located downstream of and in fluid communication with The pulse detonation combustor and the cooling plenum and located upstream of and in fluid communication with the axial turbine assembly.

14. The pulse detonation engine of claim 13, wherein the transition piece further comprises a turbulent flow mixer.

15. The pulse detonation engine of claim 2, wherein the transition piece comprises a body configured to modify a velocity profile of a high-pressure gas exiting a pulse detonation chamber.

16. pulse detonation engine of claim 15, further comprising a turbulent flow mixer located on a surface of the body.

17. The pulse detonation engine of claim 16, wherein the turbulent flow mixer is located on an outer surface of the body.

18. The pulse detonation engine of claim 15, further comprising a plurality of turbulent flow mixers located on the surface of the body.

19. The pulse detonation engine of claim 15, wherein the body comprises a truncated funnel shape.

* * * * *

UNITED STATES PATENT AND TRADEMARK OFFICE
CERTIFICATE OF CORRECTION

PATENT NO. : 7,526,912 B2  Page 1 of 1
APPLICATION NO. : 11/262652
DATED : May 5, 2009
INVENTOR(S) : Tangirala et al.

It is certified that error appears in the above-identified patent and that said Letters Patent is hereby corrected as shown below:

In Column 8, Line 34, in Claim 13, delete "The" and insert -- the --, therefor.

In Column 8, Line 43, in Claim 16, delete "pulse" and insert -- The pulse --, therefor.

Signed and Sealed this

Eleventh Day of August, 2009

David J. Kappos
*Director of the United States Patent and Trademark Office*